(12) United States Patent
Komatsu (10) Patent No.: US 11,527,760 B2
(45) Date of Patent: Dec. 13, 2022

(54) ALUMINUM MEMBER FOR ELECTRODES AND METHOD OF PRODUCING ALUMINUM MEMBER FOR ELECTRODES

(71) Applicant: FUJIFILM Corporation, Tokyo (JP)

(72) Inventor: Hiroshi Komatsu, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/503,046

(22) Filed: Oct. 15, 2021

(65) Prior Publication Data

US 2022/0037671 A1 Feb. 3, 2022

Related U.S. Application Data (60) Division of application No. 16/366,157, filed on Mar. 27, 2019, now abandoned, which is a continuation of
(Continued)

(30) Foreign Application Priority Data

Sep. 29, 2016 (JP) .............................. JP2016-191022
Feb. 22, 2017 (JP) .............................. JP2017-030813

(51) Int. Cl.
*H01M 4/66* (2006.01)
*H01M 4/04* (2006.01)
(Continued)

(52) U.S. Cl.
CPC .............. *H01M 4/667* (2013.01); *H01B 1/02* (2013.01); *H01B 5/00* (2013.01); *H01G 11/68* (2013.01);
(Continued)

(58) Field of Classification Search
CPC ........ H01M 4/661; H01M 4/66; H01M 4/667; H01M 4/0452; H01M 4/0471; H01M 4/139; H01M 4/662; H01M 4/742; H01M 4/80

See application file for complete search history.

(56) References Cited

U.S. PATENT DOCUMENTS 5,808,857 A    9/1998  Stevens
2010/0323499 A1*  12/2010  Takahashi ......... H01L 29/66348
                                                          438/653

(Continued)

FOREIGN PATENT DOCUMENTS

CN        1920108 A      2/2007
CN      102203993 A      9/2011
(Continued)

OTHER PUBLICATIONS

Communication dated Jul. 3, 2020 from the State Intellectual Property Office of the P.R.C. in Application No. 201780060297.2.
(Continued)

*Primary Examiner* — Imran Akram
(74) *Attorney, Agent, or Firm* — Sughrue Mion, PLLC (57) ABSTRACT

Provided is an aluminum member for electrodes capable of stably maintaining a low electric resistance state, and a method of producing an aluminum member for electrodes. An aluminum member for electrodes includes an aluminum substrate and an oxide film that is laminated on at least one main surface of the aluminum substrate, and the oxide film has a density of 2.7 to 4.1 $g/cm^3$ and a thickness of 5 nm or less.

9 Claims, 3 Drawing Sheets

Related U.S. Application Data application No. PCT/JP2017/034356, filed on Sep. 22, 2017.

(51) Int. Cl.
  *H01G 11/68*    (2013.01)
  *H01B 5/00*     (2006.01)
  *H01B 1/02*     (2006.01)
  *H01G 11/70*    (2013.01)

(52) U.S. Cl.
  CPC .......... *H01G 11/70* (2013.01); *H01M 4/0452* (2013.01); *H01M 4/0471* (2013.01); *H01M 4/66* (2013.01); *H01M 4/661* (2013.01); *H01M 4/662* (2013.01); *H01B 1/023* (2013.01); *Y02E 60/13* (2013.01)

(56) References Cited

U.S. PATENT DOCUMENTS

| | | | |
|---|---|---|---|
| 2011/0013340 A1* | 1/2011 | Horiuchi | H05K 1/162 |
| | | | 361/311 |
| 2011/0200884 A1 | 8/2011 | Uchida | |
| 2016/0049251 A1* | 2/2016 | Ahn | H01G 4/26 |
| | | | 361/301.4 |
| 2017/0200568 A1 | 7/2017 | Kawaguchi | |
| 2017/0214059 A1 | 7/2017 | Komatsu | |
| 2018/0040900 A1* | 2/2018 | Zhamu | H01M 4/663 |

FOREIGN PATENT DOCUMENTS

| | | | |
|---|---|---|---|
| CN | 105869905 A | 8/2016 | |
| JP | 2000-156328 A | 6/2000 | |
| JP | 2010-118258 A | 5/2010 | |
| JP | 2011-096667 A | 5/2011 | |
| JP | 2013-026041 A | 2/2013 | |
| JP | 2014-072267 A | 4/2014 | |
| KR | 1020110084986 A | 7/2011 | |
| WO | 02/03404 A2 | 1/2002 | |
| WO | 2016/017380 A1 | 2/2016 | |
| WO | 2016/051976 A1 | 4/2016 | |
| WO | 2016/060037 A1 | 4/2016 | |

OTHER PUBLICATIONS

Communication dated Jun. 9, 2020, from the Japanese Patent Office in Application No. 2018-542523.
Communication dated Oct. 2, 2019, from the European Patent Office in counterpart European Application No. 17856000.9.
Communication issued to Japanese Patent Application No. 2018-542523 dated Sep. 8, 2020.
D. de la Fuente, et al., "Studies of long-term weathering of aluminium in the atmosphere", Corrosion Science, May 21, 2007, vol. 49, No. 7, pp. 3134-3148 (15 pages total).
International Preliminary Report on Patentability dated Apr. 2, 2019 in counterpart with International Application No. PCT/JP2017-034356.
International Search Report dated Dec. 19, 2017 from the International Searching Authority in counterpart International Application No. PCT/JP2017/034356.
Notice of Reasons for Refusal dated Jan. 28, 2020, issued by the Japanese Patent Office in Application No. 2018-542523.
Notification of Reason for Refusal dated Mar. 19, 2020 from the Korean Intellectual Property Office in application No. 10-2019-7006595.
Written Opinion dated Dec. 19, 2017 from the International Searching Authority in counterpart International Application No. PCT/JP2017-034356.
Zhou, ed. et al., "New Material Dictionary", Dec. 1, 1996, pp. 561-563 (total 6 pages).

\* cited by examiner

ALUMINUM MEMBER FOR ELECTRODES AND METHOD OF PRODUCING ALUMINUM MEMBER FOR ELECTRODES

CROSS-REFERENCE TO RELATED APPLICATIONS

This application is a Divisional Application of U.S. application Ser. No. 16/366,157, filed on Mar. 27, 2019, which is a Continuation of PCT International Application No. PCT/JP2017/034356 filed on Sep. 22, 2017, which claims priority under 35 U.S.C. § 119(a) to Japanese Patent Application No. 2016-191022, filed on Sep. 29, 2016 and Japanese Patent Application No. 2017-030813, filed on Feb. 22, 2017. Each of the above applications is hereby expressly incorporated by reference, in its entirety, into the present application.

BACKGROUND OF THE INVENTION

1. Field of the Invention

The present invention relates to an aluminum member for electrodes used in current collectors for storage devices and the like, and a method of producing an aluminum member for electrodes.

2. Description of the Related Art

In recent years, in response to the development of portable devices such as personal computers and mobile phones, hybrid vehicles, electric vehicles, and the like, the demand for storage devices, particularly, lithium ion capacitors, lithium ion secondary batteries, and electric double layer capacitors as power supplies has been increased.

It is known that as electrode current collectors (hereinafter simply referred to as "current collectors") used for positive electrodes or negative electrodes of such storage devices, aluminum plates are used. In addition, it is known that an active material such as activated charcoal is applied to the surface of a current collector formed of the aluminum plate and is used as positive electrodes or negative electrodes.

For example, JP2011-096667A describes the use of an aluminum foil as a current collector and describes the application of an active material to this aluminum foil to be used as electrodes ([claim 1], [0021]).

In addition, WO2016/060037A describes the use of an aluminum plate having a plurality of through holes as a current collector ([claim 1]).

Such a current collector formed of aluminum is likely to be oxidized and is oxidized in a case in which the current collector is exposed to the atmosphere, and thus the current collector has always an oxide film. Since an oxide film has high insulating properties, in a case in which a thick oxide film is present on the surface of the current collector, the electric resistance between the current collector and the active material layer may be increased.

Therefore, JP2011-096667A describes that by laminating a conductive layer having conductivity on the surface oxide film of the aluminum substrate, the thickness of the surface oxide film of the aluminum substrate is set to 3 nm or less to ensure conductivity and suppress an increase in electric resistance.

SUMMARY OF THE INVENTION

However, in the constitution in which the thickness of the surface oxide film of the aluminum substrate is set to a predetermined thickness or less by laminating a conductive layer having conductivity on the surface oxide film of the aluminum substrate, it is necessary to form the conductive layer on the surface oxide film after the thickness of the surface oxide film of the aluminum substrate is adjusted to a predetermined thickness or less by etching processing, and thus the step is complicated. Therefore, there is a problem of poor productivity.

An object of the present invention is to provide an aluminum member for electrodes capable of stably maintaining a low electric resistance state and having high productivity, and a method of producing an aluminum member for electrodes.

As a result of conducting intensive studies to achieve the above object, the present inventors have found that by providing an aluminum member for electrodes having an aluminum substrate, and an oxide film that is laminated on at least one main surface of the aluminum substrate, in which the oxide film has a density of 2.7 to 4.1 g/cm$^3$ and a thickness of 5 nm or less, the above object can be achieved, and thus have completed the present invention.

That is, the above object can be achieved by the following constitutions.

[1] An aluminum member for electrodes comprising:
an aluminum substrate; and
an oxide film that is laminated on at least one main surface of the aluminum substrate, in which the oxide film has a density of 2.7 to 4.1 g/cm$^3$ and a thickness of 5 nm or less.

[2] The aluminum member for electrodes according to [1], in which the oxide film contains any one of aluminum oxide ($Al_2O_3$), aluminum oxide monohydrate ($Al_2O_3 \cdot 1H_2O$), or aluminum oxide trihydrate ($Al_2O_3 \cdot 3H_2O$).

[3] The aluminum member for electrodes according to [1] or [2], in which the oxide film contains 70% or more of aluminum oxide ($Al_2O_3$).

[4] The aluminum member for electrodes according to any one of [1] to [3], in which the oxide film contains 45% or less of aluminum oxide monohydrate ($Al_2O_3 \cdot 1H_2O$) and aluminum oxide trihydrate ($Al_2O_3 \cdot 3H_2O$).

[5] The aluminum member for electrodes according to any one of [1] to [4], further comprising:
a plurality of through holes that penetrate the aluminum substrate and the oxide film in a thickness direction.

[6] The aluminum member for electrodes according to [5], in which an average opening diameter of the through holes is 0.1 μm or more and less than 100 μm.

[7] The aluminum member for electrodes according to [5] or [6], in which an average opening ratio of the through holes is 0.5% to 30%.

[8] The aluminum member for electrodes according to any one of [1] to [7], in which the aluminum substrate has a thickness of 5 μm to 100 μm.

[9] The aluminum member for electrodes according to any one of [1] to [8], in which the oxide film is laminated on both surfaces of the aluminum substrate.

[10] A method of producing an aluminum member for electrodes for producing the aluminum member for electrodes according to any one of [1] to [9], the method comprising:
a coating forming step of carrying out an electrolytic treatment in a first acidic aqueous solution using an aluminum substrate as a cathode to form an aluminum hydroxide coating on a surface of the aluminum substrate;
a coating removing step of bringing the aluminum substrate after the coating forming step into contact with an alkaline aqueous solution to remove the aluminum hydroxide coating; and an oxide film forming step of bringing the aluminum substrate after the coating removing step into contact with a second acidic aqueous solution to form an oxide film on the surface of the aluminum substrate.

[11] The method of producing an aluminum member for electrodes according to [10], further comprising:

a through hole forming step of carrying out an electrolytic treatment in a third acidic aqueous solution using the aluminum substrate as an anode to form through holes in the aluminum substrate and the aluminum hydroxide coating after the coating forming step and before the coating removing step.

[12] The method of producing an aluminum member for electrodes according to [10] or [11], in which the second acidic aqueous solution includes nitric acid, sulfuric acid, phosphoric acid, oxalic acid, or a mixed acid of two or more thereof.

[13] The method of producing an aluminum member for electrodes according to any one of [10] to [12], in which the second acidic aqueous solution includes nitric acid, sulfuric acid, or a mixed acid thereof.

[14] The method of producing an aluminum member for electrodes according to any one of [10] to [13], further comprising:

a water washing step of washing the aluminum substrate with water after the oxide film forming step.

[15] The method of producing an aluminum member for electrodes according to [14], further comprising:

a drying step of removing a water film adhering to the oxide film of the aluminum substrate after the water washing step.

[16] The method of producing an aluminum member for electrodes according to [15], in which the drying step is a step of heating the aluminum substrate to 100° C. to 200° C.

[17] The method of producing an aluminum member for electrodes according to any one of [14] to [16], further comprising:

an oxide film densification step of heating the aluminum substrate after the water washing step and removing a hydrate contained in the oxide film of the aluminum substrate to densify the oxide film.

[18] The method of producing an aluminum member for electrodes according to [17], in which a heating temperature in the oxide film densification step is 100° C. to 400° C.

As described below, according to the present invention, it is possible to provide an aluminum member for electrodes capable of stably maintaining a low electric resistance state and having high productivity, and a method of producing an aluminum member for electrodes.

DESCRIPTION OF THE PREFERRED EMBODIMENTS

Hereinafter, the present invention will be described in detail.

The descriptions of the constituent features described below may be made based on representative embodiments of the present invention, but the present invention is not limited to such embodiments.

In the specification, a numerical range expressed by using "to" means a range including numerical values described before and after "to" as a lower limit and an upper limit.

[Aluminum Member for Electrodes]

An aluminum member for electrodes according to an embodiment of the present invention includes an aluminum substrate, and an oxide film that is laminated on at least one main surface of the aluminum substrate, in which the oxide film has a density of 2.7 to 4.1 $g/cm^3$ and a thickness of 5 nm or less.

Next, the constitution of the aluminum member for electrodes according to the embodiment of the present invention will be described using FIG. 1.

Figure 1:
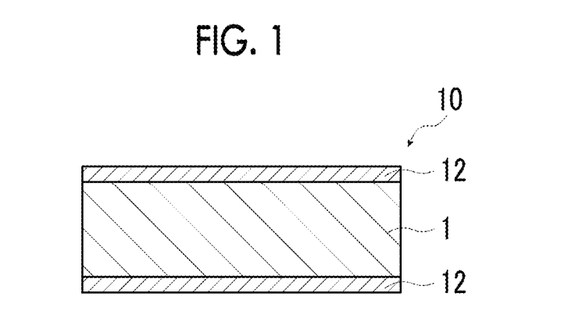
FIG. 1 is a cross-sectional view schematically showing an example of an aluminum member for electrodes of the present invention.

FIG. 1 is a cross-sectional view schematically showing an example of an aluminum member for electrodes according to a suitable embodiment of the present invention.

As shown in FIG. 1, in an aluminum member for electrodes 10, oxide films 12 are respectively laminated on both main surfaces of an aluminum substrate 1.

The aluminum member for electrodes according to the embodiment of the present invention is used as a current collector and is used as a positive electrode or a negative electrode of a storage device by applying an active material to the surface thereof.

Here, in the aluminum member for electrodes according to the embodiment of the present invention, the oxide film 12 has a density of 2.7 to 4.1 $g/cm^3$ and a thickness of 5 nm or less.

As described above, aluminum is likely to be oxidized and is oxidized in a case in which aluminum is exposed to the atmosphere, and thus an oxide film is always provided. Since an oxide film has high insulating properties, in a case in which a thick oxide film is present on the surface of the aluminum substrate, there is a problem that the electric resistance between the aluminum substrate and the active material may be increased. Therefore, in order to suppress the oxidation proceeding with time, it is necessary to store the material under certain conditions in a case of storage.

In addition, it is considered to make the oxide film on the surface of the aluminum substrate thin and laminate a conductive layer having conductivity on the oxide film to ensure conductivity. However, even in a case in which a conductive layer having conductivity is laminated on the oxide film, the oxidation of the aluminum substrate proceeds with time, the thickness of the oxide film becomes thick, and thus there is a problem that the electric resistance may be increased.

Further, for a constitution in which a conductive layer is laminated on the oxide film, it is necessary to form a conductive layer on the oxide film after the thickness of the oxide film of the aluminum substrate is adjusted to a predetermined thickness or less by etching processing or the like, and the step is complicated. Thus, there is a problem of poor productivity.

In contrast, in the aluminum member for electrodes according to the embodiment of the present invention, the oxide film has a film thickness of 5 nm or less and a film density of 2.7 to 4.1 g/cm$^3$.

According to the studies of the present inventors, it has been found that in a case in which the film density of the oxide film is low, moisture permeates the oxide film and reaches the aluminum substrate, the oxidation of the aluminum substrate progresses to increase the film thickness of the oxide film, and thus the electric resistance is increased.

In contrast, since moisture can be prevented from permeating the oxide film and reaching the aluminum substrate by setting the film density of the oxide film to 2.7 to 4.1 g/cm$^3$, it is possible to suppress the progress of the oxidation of the aluminum substrate and suppress an increase the thickness of the oxide film. Thus, it is possible to stably maintain a low electric resistance state.

In addition, since the oxide film having a film thickness of 5 nm or less and satisfying a film density of 2.7 to 4.1 g/cm$^3$ can be easily formed, the step is not complicated and the productivity is high.

A method of forming the oxide film having a film thickness of 5 nm or less and satisfying a film density of 2.7 to 4.1 g/cm$^3$ will be described in detail later.

Here, from the viewpoint of being capable of further decreasing the electric resistance between the aluminum substrate and the active material or the like, the film thickness of the oxide film is preferably 1 nm to 5 nm and more preferably 1 nm to 3 nm.

The film thickness of the oxide film is obtained by observing the cross section with a transmission electron microscope (TEM), measuring the film thickness at three places, and calculating an average value as the film thickness.

In addition, from the viewpoint of being capable of more reliably suppressing the progress of the oxidation of the aluminum substrate, the film density of the oxide film is preferably 2.7 to 4.1 g/cm$^3$ and more preferably 3.2 to 4.1 g/cm$^3$.

The film density of the oxide film is measured using a high resolution Rutherford backscattering spectrometry (RBS) HRBS500 (HR-RBS) manufactured by Kobe Steel, Ltd. He ions with an energy of 450 keV are made incident on a sample at 62.5 degrees to the normal to the sample surface (the surface of the oxide film of the aluminum member for electrodes), and the scattered He ions are detected by a deflection magnetic field type energy analyzer at a position of a scattering angle of 55 degrees to obtain areal density. The obtained areal density (atoms/cm$^2$) is converted into mass areal density (g/cm$^2$) and the density (g/cm$^3$) of the oxide film is calculated from this value and the film thickness measured with a transmission electron microscope (TEM).

Here, in the example shown in FIG. 1, the oxide film is laminated on the non-porous aluminum substrate but there is no limitation thereto. A plurality of through holes penetrating the aluminum substrate in a thickness direction may be provided.

Figure 2A:
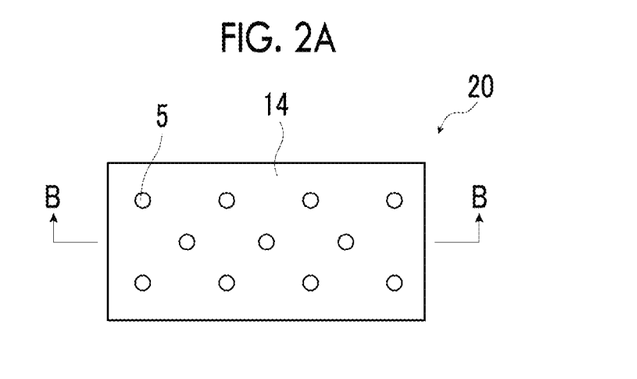
FIG. 2A is a top view schematically showing another example of the aluminum member for electrodes of the present invention.
Figure 2B:
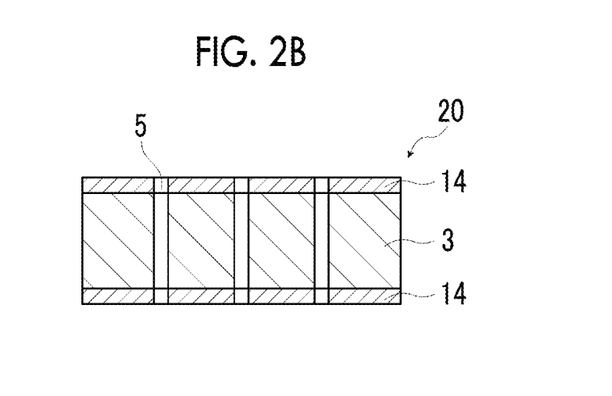
FIG. 2B is a cross-sectional view taken along line B-B of FIG. 2A.

FIG. 2A is a top view schematically showing another example of the aluminum member for electrodes according to the embodiment of the present invention, and FIG. 2B is a cross-sectional view taken along line B-B of FIG. 2A.

An aluminum member for electrodes 20 shown in FIGS. 2A and 2B has a plurality of through holes 5 that penetrate an aluminum substrate and the oxide film in the thickness direction. That is, the aluminum member for electrodes 20 has a constitution in which an aluminum substrate 3 having through holes penetrating the aluminum substrate in the thickness direction and an oxide film 14 having through holes penetrating the oxide film in the thickness direction are laminated. In a plane direction of a main surface of the aluminum member for electrodes 20, the plurality of through holes formed in the aluminum substrate 3 and the plurality of through holes formed in the oxide film 14 are formed at the same position and the plurality of through holes 5 respectively penetrate the aluminum substrate and the oxide film in the thickness direction.

By providing the plurality of through holes penetrating the aluminum substrate and the oxide film in the thickness direction in the aluminum member for electrodes, in a case of using the aluminum member for electrodes as a current collector, it is possible to facilitate the movement of lithium ions. In addition, by providing the plurality of through holes, it is possible to improve the adhesiveness with the active material.

In addition, the average opening diameter of the through holes is preferably 0.1 μm or more and less than 100 μm, more preferably more than 1 μm and 80 μm or less, even more preferably more than 3 μm and 40 μm or less, and particularly preferably 5 μm or more and 30 μm or less.

By setting the average opening diameter of the through holes to be in the above range, it is possible to prevent the occurrence of coating failure or the like in a case of applying the active material to the aluminum member for electrodes and to improve the adhesiveness with the applied active material. In addition, even in a case in which the aluminum member for electrodes has the plurality of through holes, sufficient tensile strength can be attained.

The average opening diameter of the through holes is obtained by capturing an image of the surface of the aluminum member for electrodes using a high resolution scanning electron microscope (SEM) at a magnification of 200 times from one surface of the aluminum member for electrodes, extracting at least 20 through holes having a circumference that continues in a ring shape from the obtained SEM image, scanning the opening diameters thereof, and calculating the average value thereof as the average opening diameter.

In addition, the maximum value of a distance between the end portions of the through hole portion is measured as the opening diameter. That is, since the shape of the opening portion of the through hole is not limited to a substantially circular shape, in a case in which the shape of the opening portion is non-circular, the maximum value of the distance between the end portions of the through hole portion is defined as the opening diameter. Therefore, for example, even in a case of through holes having such a shape that two or more through holes are integrated, this is regarded as one through hole, and the maximum value of the distance between the end portions of the through hole portion is taken as the opening diameter.

In addition, the average opening ratio of the through holes is preferably 0.5% to 30%, more preferably 1% to 30%, even more preferably 3% to 20%, and particularly preferably 3% to 10%.

By setting the average opening ratio of the through holes to be in the above range, it is possible to prevent coating failure or the like from occurring when the active material is applied to the aluminum member for electrodes and to improve the adhesiveness with the applied active material. In addition, even in a case in which the aluminum member for electrodes has the plurality of through holes, sufficient tensile strength can be attained.

The average opening ratio of the through holes is obtained by capturing an image of the surface of the aluminum member for electrodes from right above using a high resolution scanning electron microscope (SEM) at a magnification of 200 times, binarizing (five) 30 mm×30 mm visual fields in the obtained SEM image using image analysis software or the like so as to observe through hole portions and non-through hole portions, calculating the ratio (the opening area/the geometric area) from the total opening area of the through holes and the area of the visual fields (the geometric area), and calculating the average value of those at the respective visual fields (five places) as the average opening ratio.

Further, the aluminum member for electrodes 10 shown in FIG. 1 and the aluminum member for electrodes 20 shown in FIG. 2 have the constitution in which the oxide film is laminated on both main surfaces of the aluminum substrate, but there is no limitation thereto. The oxide film may be laminated on at least one main surface of the aluminum substrate.

<Aluminum Substrate>

The aluminum substrate is not particularly limited, and it is possible to use well-known aluminum substrates, for example, alloy Nos. 1085, 1N30, 3003, and the like described in JIS Standards H4000. Meanwhile, the aluminum substrate is an alloy plate including aluminum as a main component and a small amount of foreign elements.

The thickness of the aluminum substrate is not particularly limited, but is preferably 5 μm to 100 μm and more preferably 10 μm to 30 μm.

<Oxide Film>

The oxide film is a layer containing aluminum oxide such as aluminum oxide ($Al_2O_3$) and in which the aluminum oxide is present in the form of aluminum hydrate such as aluminum oxide monohydrate ($Al_2O_3 \cdot 1H_2O$) or aluminum oxide trihydrate ($Al_2O_3 \cdot 3H_2O$).

Here, as described above, in the present invention, the oxide film has a density of 2.7 to 4.1 g/cm³ and a thickness of 5 nm or less.

Generally, aluminum likely to be oxidized and is oxidized in a case in which aluminum is exposed to the atmosphere. The oxide film formed by natural oxidation tends to have a high hydrate proportion and has low density.

In contrast, the oxide film of the aluminum member for electrodes according to the embodiment of the present invention has a small hydrate proportion and has large aluminum oxide proportion. Thus, the density of the oxide film is as high as 2.7 to 4.1 g/cm³.

Since such an oxide film with high density is easily formed by an oxide film forming treatment to be described later, the productivity is high.

The density of aluminum oxide ($Al_2O_3$) is about 4.1 g/cm³, the density of aluminum oxide monohydrate ($Al_2O_3 \cdot 1H_2O$) is about 3.07 g/cm³, and the density of aluminum oxide trihydrate ($Al_2O_3 \cdot 3H_2O$) is about 2.42 g/cm³.

Accordingly, as the proportion of the hydrate increases, the density of the oxide film decreases. For example, in a case in which the density of the oxide film is less than 3.95 g/cm³, the oxide film contains 3% or more of a hydrate.

From the viewpoint of obtaining an oxide film having high density, the amount of aluminum oxide ($Al_2O_3$) in the oxide film is preferably 70% or more, more preferably 80% or more, and even more preferably 90% or more.

In addition, the amount of aluminum oxide monohydrate ($Al_2O_3 \cdot 1H_2O$) and aluminum oxide trihydrate ($Al_2O_3 \cdot 3H_2O$) contained in the oxide film is preferably 45% or less, more preferably 30% or less, and even more preferably 15% or less.

[Method of Producing Aluminum Member for Electrodes]

Next, a method of producing an aluminum member for electrodes according to an embodiment of the present invention will be described.

The method of producing an aluminum member for electrodes according to the embodiment of the present invention includes a coating forming step of carrying out an electrolytic treatment in a first acidic aqueous solution using an aluminum substrate as a cathode to form an aluminum hydroxide coating on a surface of the aluminum substrate, a coating removing step of immersing the aluminum substrate after the coating forming step in an alkaline aqueous solution to remove the aluminum hydroxide coating, and an oxide film forming step of immersing the aluminum substrate after the coating removing step in a second acidic aqueous solution to form an oxide film on the surface of the aluminum substrate.

By the oxide film forming step, an oxide film having a density of 2.7 to 4.1 g/cm³ and a thickness of 5 nm or less is formed on the aluminum substrate.

In addition, by the coating removing step, an unnecessary coating, oil, or the like is removed to expose the aluminum substrate so as to facilitate the formation of the oxide film.

Further, in a case of producing the aluminum member for electrodes having through holes as shown in FIG. 2B, it is preferable to provide a through hole forming step of carrying out an electrolytic treatment in a third acidic aqueous solution using aluminum substrate as an anode after the coating forming step and before the coating removing step in the aluminum substrate and carrying out a through hole forming treatment on the aluminum hydroxide coating to form through holes.

It is preferable to provide a water washing step of carrying out a water washing treatment after the completion of each of the coating forming step, the coating removing step, the oxide film forming step, and the through hole forming step.

In addition, it is preferable to provide a drying step of carrying out a drying treatment after the water washing treatment after each step.

Hereinafter, each step of the method of producing an aluminum member for electrodes will be described with reference to FIGS. 3A to 3E using the aluminum member for electrodes having the through holes shown in FIG. 2B as an example, and then each step will be described.

FIGS. 3A to 3E are schematic cross-sectional views for describing an example of a suitable embodiment of the method of producing an aluminum member for electrodes of the present invention.

Figure 3A:
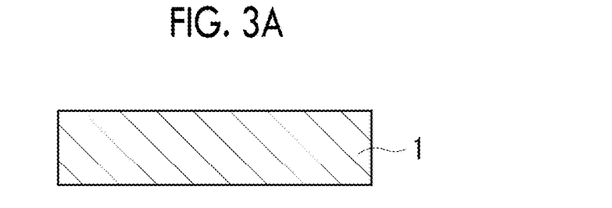
FIG. 3A is a schematic cross-sectional view for describing an example of a suitable method of producing an aluminum member for electrodes of the present invention.
Figure 3B:
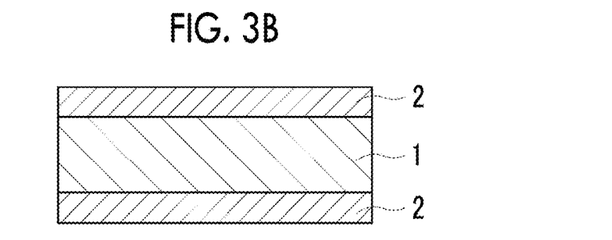
FIG. 3B is a schematic cross-sectional view for describing the example of the suitable method of producing the aluminum member for electrodes of the present invention.
Figure 3C:
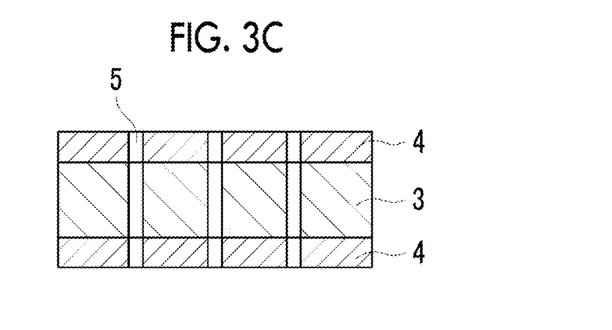
FIG. 3C is a schematic cross-sectional view for describing the example of the suitable method of producing the aluminum member for electrodes of the present invention.
Figure 3D:
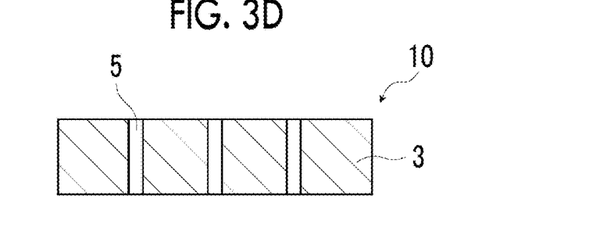
FIG. 3D is a schematic cross-sectional view for describing the example of the suitable method of producing the aluminum member for electrodes of the present invention.
Figure 3E:
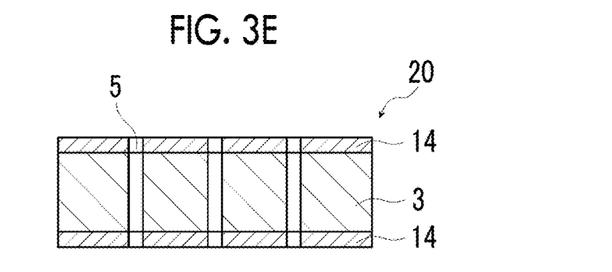
FIG. 3E is a schematic cross-sectional view for describing the example of the suitable method of producing the aluminum member for electrodes of the present invention.

As shown in FIGS. 3A to 3E, the method of producing an aluminum member for electrodes includes a coating forming step of carrying out a coating forming treatment on both main surfaces of an aluminum substrate 1 to form an aluminum hydroxide coating 2 (FIGS. 3A and 3B), a through hole forming step of forming through holes 5 by carrying out an electrolytic dissolution treatment after the coating forming step, thereby forming an aluminum substrate 3 having the through holes and an aluminum hydroxide coating 4 having the through holes (FIGS. 3B and 3C), a coating removing step of removing the aluminum hydroxide coating 4 having the through holes after the through hole forming step to prepare the aluminum substrate 3 having the through holes (FIGS. 3C and 3D), and an oxide film forming step of carrying out an oxide film forming treatment after the coating removing step to form an oxide film having a density of 2.7 to 4.1 g/cm$^3$ and a thickness of 5 nm or less on both main surfaces of the aluminum substrate 3 having the through holes (FIGS. 3D and 3E).

[Coating Forming Step]

The coating forming step is a step of carrying out an electrolytic treatment (coating forming treatment) in a first acidic aqueous solution using an aluminum substrate as a cathode to form an aluminum hydroxide coating on a surface of the aluminum substrate.

<Coating Forming Treatment>

The above coating forming treatment is not particularly limited, and it is possible to carry out, for example, the same treatment as well-known aluminum hydroxide coating forming treatments of the related art.

As the coating forming treatment, it is possible to appropriately employ, for example, conditions or devices described in paragraphs [0013] to [0026] of JP2011-201123A.

In the present invention, the conditions of the coating forming treatment vary in diverse manners depending on electrolytic solutions being used and thus cannot be determined uniformly. However, generally, the concentration of an electrolytic solution in a range of 1% to 80% by mass, the liquid temperature in a range of 5° C. to 70° C., the current density in a range of 0.5 to 60 A/dm$^2$, the voltage in a range of 1 to 100 V, and the electrolysis duration in a range of 1 second to 20 minutes are appropriate and are adjusted so as to obtain a desired amount of a coating.

In the present invention, an electrochemical treatment is preferably carried out using nitric acid, hydrochloric acid, sulfuric acid, phosphoric acid, oxalic acid, or a mixed acid of two or more of these acids as an electrolytic solution (first acidic aqueous solution).

In a case in which the electrochemical treatment is carried out in an electrolytic solution containing nitric acid and hydrochloric acid, direct current or alternating current may be applied between the aluminum substrate and a counter electrode. In a case in which direct current is applied to the aluminum substrate, the current density is preferably 1 to 60 A/dm$^2$ and more preferably in a range of 5 to 50 A/dm$^2$. In a case in which the electrochemical treatment is carried out continuously, the anodization is preferably carried out using a liquid power feeding method in which power is fed to the aluminum substrate through an electrolytic solution.

In the present invention, the amount of the aluminum hydroxide coating being formed by the coating forming treatment is preferably 0.05 to 50 g/m$^2$ and more preferably in a range of 0.1 to 10 g/m$^2$.

[Through Hole Forming Step]

The through hole forming step is a step of carrying out an electrolytic treatment (electrolytic dissolution treatment) in a third acidic aqueous solution using the aluminum substrate as an anode after the coating forming step to form through holes in the aluminum substrate and the aluminum hydroxide coating.

<Electrolytic Dissolution Treatment>

The above electrolytic dissolution treatment is not particularly limited, and it is possible to use direct current or alternating current and use an acidic solution (third acidic aqueous solution) as an electrolytic solution. Among acidic solutions, the electrochemical treatment is preferably carried out using at least one of nitric acid or hydrochloric acid, and the electrochemical treatment is more preferably carried out using a mixed acid of at least one of sulfuric acid, phosphoric acid, or oxalic acid in addition to the above-described acids.

In the present invention, as the acidic solution which is the electrolytic solution, it is possible to use, in addition to the above-described acids, electrolytic solutions described in the respective specifications of U.S. Pat. Nos. 4,671,859A, 4,661,219A, 4,618,405A, 4,600,482A, 4,566,960A, 4,566,958A, 4,566,959A, 4,416,972A, 4,374,710A, 4,336,113A, and 4,184,932A.

The concentration of the acidic solution is preferably 0.1% to 2.5% by mass and more preferably 0.2% to 2.0% by mass. In addition, the liquid temperature of the acidic solution is preferably 20° C. to 80° C. and more preferably 30° C. to 60° C.

In addition, as an aqueous solution including the above-described acid as a main body, it is possible to use an aqueous solution obtained by adding at least one of a nitric acid compound having nitric acid ions such as aluminum nitrate, sodium nitrate, or ammonium nitrate, a hydrochloric acid compound having hydrochloric acid ions such as aluminum chloride, sodium chloride, or ammonium chloride, or a sulfuric acid compound having sulfuric acid ions such as aluminum sulfate, sodium sulfate, or ammonium sulfate to an aqueous solution of an acid which has a concentration of 1 to 100 g/L in a range of 1 g/L to saturation.

In addition, in the aqueous solution including the above-described acid as the main body, metals which are included in an aluminum alloy, such as iron, copper, manganese, nickel, titanium, magnesium, and silica, may be dissolved. A liquid obtained by adding aluminum chloride, aluminum nitrate, aluminum sulfate, or the like to an aqueous solution of an acid having a concentration in a range of 0.1% to 2% by mass so that the concentration of aluminum ions falls in a range of 1 to 100 g/L is preferably used.

In the electrochemical dissolution treatment, direct current is mainly used. However, in a case in which alternating current is used, the alternating current power source wave is not particularly limited, and a sine wave, a square wave, a trapezoidal wave, a triangular wave, and the like can be used. Among these, a square wave or a trapezoidal wave is preferable, and a trapezoidal wave is particularly preferable.

(Nitric Acid Electrolysis)

In the present invention, it is possible to easily form through holes which have an average opening diameter of 0.1 μm or more and less than 100 μm by an electrochemical dissolution treatment in which an electrolytic solution including nitric acid as a main body is used (hereinafter, also abbreviated as "nitric acid dissolution treatment").

Here, the nitric acid dissolution treatment is preferably an electrolytic treatment which is carried out using direct current under conditions of an average current density set to 5 A/dm$^2$ or higher and a quantity of electricity set to 50 C/dm$^2$ or more since it is easy to control dissolution points of through hole formation. Meanwhile, the average current density is preferably 100 A/dm$^2$ or less, and the quantity of electricity is preferably 10000 C/dm$^2$ or less.

In addition, the concentration or temperature of the electrolytic solution in the nitric acid electrolysis is not particularly limited, and it is possible to carry out electrolysis using a nitric acid electrolytic solution having a high concentration, for example, a nitric acid concentration in a range of 15% to 35% by mass at 30° C. to 60° C. or carry out electrolysis using a nitric acid electrolytic solution having a nitric acid concentration in a range of 0.7% to 2% by mass at a high temperature, for example, at 80° C. or higher.

In addition, it is possible to carry out electrolysis using an electrolytic solution obtained by mixing at least one of sulfuric acid, oxalic acid, or phosphoric acid having a concentration of 0.1% to 50% by mass into the above-described nitric acid electrolytic solution.

(Hydrochloric Acid Electrolysis)

In the present invention, it is also possible to easily form through holes which have an average opening diameter of 1 µm or more and less than 100 µm by an electrochemical dissolution treatment in which an electrolytic solution including hydrochloric acid as a main body is used (hereinafter, also abbreviated as "hydrochloric acid dissolution treatment").

Here, the hydrochloric acid dissolution treatment is preferably an electrolytic treatment which is carried out using direct current under conditions of an average current density set to 5 A/dm$^2$ or higher and a quantity of electricity set to 50 C/dm$^2$ or more since it is easy to control dissolution points of through hole formation. Meanwhile, the average current density is preferably 100 A/dm$^2$ or less, and the quantity of electricity is preferably 10000 C/dm$^2$ or less.

In addition, the concentration or temperature of the electrolytic solution in the hydrochloric acid electrolysis is not particularly limited, and it is possible to carry out electrolysis using a hydrochloric acid electrolytic solution having a high concentration, for example, a hydrochloric acid concentration in a range of 10% to 35% by mass at 30° C. to 60° C. or carry out electrolysis using a hydrochloric acid electrolytic solution having a hydrochloric acid concentration in a range in a range of 0.7% to 2% by mass at a high temperature, for example, at 80° C. or higher.

In addition, it is possible to carry out electrolysis using an electrolytic solution obtained by mixing at least one of sulfuric acid, oxalic acid, or phosphoric acid having a concentration of 0.1% to 50% by mass into the above-described hydrochloric acid electrolytic solution.

[Coating Removing Step]

The coating removing step is a step of carrying out a chemical dissolution treatment to remove the aluminum hydroxide coating.

The coating removing step is capable of removing the aluminum hydroxide coating by, for example, carrying out an acid etching treatment or an alkali etching treatment described below.

<Acid Etching Treatment>

The above-described dissolution treatment is a treatment in which the aluminum hydroxide coating is dissolved using a solution that dissolves aluminum hydroxide more preferential than aluminum (hereinafter, referred to as "aluminum hydroxide dissolution liquid").

Here, the aluminum hydroxide dissolution liquid is preferably an aqueous solution containing at least one selected from a group consisting of, for example, nitric acid, hydrochloric acid, sulfuric acid, phosphoric acid, oxalic acid, chromium compounds, zirconium-based compounds, titanium-based compounds, lithium salts, cerium salts, magnesium salts, sodium silicofluoride, zinc fluoride, manganese compounds, molybdenum compounds, magnesium compounds, barium compounds, and halogen single bodies.

Specific examples of the chromium compounds include chromium (III) oxide, and anhydrous chromium (VI) acid.

Examples of the zirconium-based compounds include ammonium fluorozirconate, zirconium fluoride, and zirconium chloride.

Examples of the titanium-based compounds include titanium oxide and titanium sulfide.

Examples of the lithium salts include lithium fluoride and lithium chloride.

Examples of the cerium salts include cerium fluoride and cerium chloride.

Examples of the magnesium salts include magnesium sulfide.

Examples of the manganese compounds include sodium permanganate and calcium permanganate.

Examples of the molybdenum compounds include sodium molybdate.

Examples of the magnesium compounds include magnesium fluoride-pentahydrate.

Examples of the barium compounds include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, and hydrates thereof.

Among the above barium compounds, barium oxide, barium acetate, and barium carbonate are preferable, and barium oxide is particularly preferable.

Examples of the halogen single bodies include chlorine, fluorine, and bromine.

Among these, the aluminum hydroxide dissolution liquid is preferably an aqueous solution containing an acid, examples of the acid include nitric acid, hydrochloric acid, sulfuric acid, phosphoric acid, oxalic acid, and the like, and the acid may be a mixture of two or more acids.

The concentration of the acid is preferably 0.01 mol/L or more, more preferably 0.05 mol/L or more, and even more preferably 0.1 mol/L or more. There is no particular upper limit, and the upper limit is generally preferably 10 mol/L or less and more preferably 5 mol/L or less.

The dissolution treatment is carried out by bringing the aluminum substrate on which the aluminum hydroxide coating is formed into contact with the above-described dissolution liquid. A method for bringing the aluminum substrate into contact with the dissolution liquid is not particularly limited, and examples thereof include a dipping method and a spraying method. Among these, the dipping method is preferable.

The dipping method is a treatment in which the aluminum substrate on which the aluminum hydroxide coating is formed is dipped into the above-described dissolution liquid. During the dipping treatment, it is preferable to carry out stirring since the treatment is carried out evenly.

The time for the dipping treatment is preferably 10 minutes or longer, more preferably one hour or longer, and even more preferably three hours or longer and five hours or longer.

<Alkali Etching Treatment>

The alkali etching treatment is a treatment in which the surface layer is dissolved by bringing the aluminum hydroxide coating into contact with an alkali solution.

Examples of alkalis that can be used in the alkali solution include caustic alkalis and alkali metal salts. Specific examples of caustic alkalis include sodium hydroxide (caustic soda) and caustic potash. In addition, examples of alkali metal salts include alkali metal silicates such as sodium metasilicate, sodium silicate, potassium metasilicate, and potassium silicate; alkali metal carbonates such as sodium carbonate and potassium carbonate; alkali metal aluminate such as sodium aluminate and potassium aluminate; alkali metal aldonates such as sodium gluconate and potassium gluconate; and alkali metal hydrogenphosphate such as sodium diphosphate, potassium diphosphate, sodium triphosphate, and potassium triphosphate. Among these, solutions of caustic alkalis and solutions containing both caustic alkali and alkali metal aluminate are preferable from the viewpoint of the fast etching rates and the cheap prices. Particularly, an aqueous solution of sodium hydroxide is preferable.

The concentration of the alkali solution is preferably 0.1% to 50% by mass and more preferably 0.2% to 10% by mass. In a case in which the alkali solution has aluminum ions dissolved therein, the concentration of aluminum ions is preferably 0.01% to 10% by mass and more preferably 0.1% to 3% by mass. The temperature of the alkali solution is preferably 10° C. to 90° C. The treatment time is preferably 1 second to 120 seconds.

Examples of the method for bringing the aluminum hydroxide coating into contact with the alkali solution include a method in which the aluminum substrate on which the aluminum hydroxide coating is formed is allowed to pass through a tank containing the alkali solution, a method in which the aluminum substrate on which the aluminum hydroxide coating is formed is dipped into a tank containing the alkali solution, and a method in which the alkali solution is sprayed to the surface (aluminum hydroxide coating) of the aluminum substrate on which the aluminum hydroxide coating is formed.

[Oxide Film Forming Step]

The oxide film forming step is a step of bring the aluminum substrate from which the aluminum hydroxide coating is removed into contact with a second acidic aqueous solution (carrying out an oxide film forming treatment) to form an oxide film having a density of 2.7 to 4.1 g/cm$^3$ and a film thickness of 5 nm or less on the surface or rear surface of the aluminum substrate.

As described above, by forming the oxide film having a small film thickness and high density on the surface of the aluminum substrate by carrying out the oxide film forming treatment, an increase in the thickness of the oxide film can be suppressed by suppressing the progress of the oxidation of the aluminum substrate with time and thus a low electric resistance state can be stably maintained.

There are the following two methods as a method of forming an oxide film with a small film thickness and high density.

Method of forming an oxide film by bringing the aluminum substrate into contact with an acidic solution in which a hydrate is difficult to be produced.

Method of densifying an oxide film by bringing the aluminum substrate into contact with an acidic solution to form the oxide film and then subjecting the aluminum substrate to a high temperature heating treatment to reduce the proportion of a hydrate in the oxide film (oxide film densification step).

(Method of Bringing Aluminum Substrate into Contact with Acidic Solution in which Hydrate is Difficult to be Produced)

Specifically, in a case in which the aluminum substrate is brought into contact with an acidic solution in which a hydrate is difficult to be produced (second acidic aqueous solution) to form an oxide film, for the acidic solution, nitric acid, sulfuric acid, phosphoric acid, oxalic acid, or a mixed acid of two or more thereof is preferably used and nitric acid, sulfuric acid, or a mixed acid thereof is more preferably used.

The concentration of the acidic solution is preferably 0.01% to 10% by mass and particularly preferably 0.1% to 5% by mass. In addition, the liquid temperature of the acidic solution is preferably 25° C. to 70° C. and more preferably 30° C. to 55° C.

In addition, the method of bringing the aluminum substrate into contact with the acidic solution is not particularly limited and examples thereof include a dipping method and a spraying method. Among these, the dipping method is preferable.

The dipping method is a treatment in which the aluminum substrate is dipped into the above-described acidic solution. During the dipping treatment, it is preferable to carry out stirring since the treatment is carried out evenly.

The time for the dipping treatment is preferably 15 seconds or longer, more preferably 30 seconds or longer, and even more preferably 40 seconds or longer.

(Method of Carrying Out Oxide Film Densification Step after Formation of Oxide Film)

In a case in which the aluminum substrate is brought into contact with the acidic solution to form the oxide film and then is subjected to a high temperature heating treatment to reduce the proportion of the hydrate in the oxide film, for the acidic solution, nitric acid, sulfuric acid, phosphoric acid, oxalic acid, or a mixed acid of two or more thereof is preferably used and nitric acid, sulfuric acid, or a mixed acid thereof is more preferably used.

The concentration of the acidic solution is preferably 0.01% to 10% by mass and particularly preferably 0.1% to 5% by mass. In addition, the liquid temperature of the acidic solution is preferably 25° C. to 70° C. and more preferably 30° C. to 55° C.

In addition, the method of bringing the aluminum substrate into contact with the acidic solution is not particularly limited and examples thereof include a dipping method and a spraying method. Among these, the dipping method is preferable.

The dipping method is a treatment in which the aluminum substrate is dipped into the above-described acidic solution. During the dipping treatment, it is preferable to carry out stirring since the treatment is carried out evenly.

The time for the dipping treatment is preferably 15 seconds or longer, more preferably 30 seconds or longer, and even more preferably 40 seconds or longer.

<Oxide Film Densification Step>

The oxide film densification step is a step of carrying out a high temperature heating treatment on the aluminum substrate after forming the oxide film by bringing the aluminum substrate into contact with the acidic solution. By carrying out a high temperature heating treatment, moisture is removed from the aluminum hydrate in the oxide film and the ratio of the aluminum oxide is increased. Thus, the density can be increased (densification) by increasing the proportion of the aluminum oxide in the oxide film.

The heating temperature is preferably 100° C. or higher and 400° C. or lower, more preferably higher than 200° C. and 350° C. or lower, and even more preferably 250° C. or higher and 330° C. or lower.

The heating time is preferably 1 minute to 30 minutes, more preferably 3 minutes to 20 minutes, and even more preferably 5 minutes to 15 minutes.

It is preferable to set the heating temperature to 300° C. or higher and the heating time to 5 minutes since the proportion of the hydrate in the oxide film can be reduced. On the other hand, in a case in which excessive heating is carried out for a long period of time, the oxidation of the aluminum substrate proceeds and thus the film thickness of the oxide film may be increased. Accordingly, the heating temperature and the heating time are preferably set to be in the above ranges.

[Water Washing Step]

As described above, in the present invention, it is preferable to provide a water washing treatment after the completion of each of the coating forming step, the coating removing step, the oxide film forming step, and the through hole forming step. In the water washing, it is possible to use pure water, well water, tap water, or the like. In order to prevent the treatment liquids from being carried to the subsequent steps, a nipping device may be used.

[Drying Step]

As described above, it is preferable to provide a drying step of carrying out a drying treatment after the water washing step after each step.

The drying method is not particularly limited and well-known drying methods such as a method of blowing off moisture with an air knife or the like, a method by heating, or the like can be appropriately used. In addition, a plurality of drying methods may be carried out.

Here, it is preferable to provide a water washing step of washing the aluminum substrate with water after the oxide film forming step and it is also preferable to provide a drying step after the water washing step after the oxide film forming step.

In the oxide film forming step, in a case in which the water washing step for removing the second acidic aqueous solution remaining on the surface of the aluminum substrate (oxide film) is carried out after the oxide film is formed on the surface of the aluminum substrate, a water film remains on the surface of the oxide film. In a case in which the water film remains on the surface of the oxide film, moisture permeates the oxide film with time and the oxide film becomes a hydrate. Thus, the density of the oxide film may be decreased.

Here, by carrying out a drying step after the water washing step after the oxide film forming step and removing the water film remaining on the surface of the oxide film, moisture permeates the oxide film with time and the oxide film becomes a hydrate. Thus, it is possible to suppress a decrease in the density of the oxide film.

The drying temperature in a case of carrying drying by heating is preferably 100° C. to 200° C. and more preferably 100° C. to 150° C. In addition, the drying time is preferably 1 to 30 seconds and more preferably 3 to 10 seconds.

Here, in the above description, the method of producing the aluminum member for electrodes having through holes as shown in FIG. 2B has been described, but in a case in which through holes are not formed, the coating forming step of forming an aluminum hydroxide coating and the through hole forming step are not required, and thus the step of removing the aluminum hydroxide coating is also not required. However, it is preferable to carry out the same coating removing step as described above in order to remove the oxide film and oil formed by natural oxidation.

[Current Collector]

As described above, the aluminum member for electrodes according to the embodiment of the present invention can be used as a current collector for a storage device (hereinafter, also referred to as "current collector").

Since the aluminum member for electrodes has a plurality of through holes in the thickness direction, for example, in a case of using the current collector for a lithium ion capacitor, pre-doping of lithium in a short period of time can be carried out and lithium can be dispersed more uniformly. In addition, the adhesiveness with the active material layer and the activated charcoal is improved and a storage device excellent in productivity such as cycle characteristics, output characteristics, coating suitability and the like can be prepared.

In addition, since the oxide film has a density of 2.7 to 4.1 $g/cm^3$ and a thickness of 5 nm or less in the current collector using the aluminum member for electrodes according to the embodiment of the present invention, the electric resistance between the active material layer and the oxide film is decreased and an efficient storage device can be prepared.

<Active Material Layer>

The active material layer is not particularly limited, and it is possible to use well-known active material layers that are used in storage devices of the related art.

Specifically, regarding conductive materials, binders, solvents, and the like which the active material and the active material layer may contain in a case in which the aluminum member for electrodes is used as a current collector for positive electrodes, it is possible to appropriately employ materials described in paragraphs [0077] to [0088] of JP2012-216513A, the content of which is incorporated into the present specification by reference.

In addition, regarding active materials in a case in which the aluminum member for electrodes is used as a current collector for negative electrodes, it is possible to appropriately employ materials described in paragraph [0089] of JP2012-216513A, the content of which is incorporated into the present specification by reference.

[Storage Device]

Electrodes in which the aluminum member for electrodes according to the embodiment of the present invention is used as a current collector can be used as positive electrodes or negative electrodes in storage devices.

Here, regarding the specific constitution or applications of storage devices (particularly, secondary batteries), it is possible to appropriately employ materials or applications described in paragraphs [0090] to [0123] of JP2012-216513A, the content of which is incorporated into the present specification by reference.

[Positive Electrode]

The positive electrode in which the aluminum member for electrodes according to the embodiment of the present invention is used as a current collector is a positive electrode having a positive electrode current collector in which the aluminum member for electrodes is used for a positive electrode and a layer including a positive electrode active material that is formed on the surface of the positive electrode current collector (positive electrode active material layer).

Here, regarding the positive electrode active material, a conductive material, a binder, a solvent, and the like that the positive electrode active material layer may include, it is possible to appropriately employ materials described in paragraphs [0077] to [0088] of JP2012-216513A, the content of which is incorporated into the present specification by reference.

[Negative Electrode]

The negative electrode in which the aluminum member for electrodes according to the embodiment of the present invention is used as a current collector is a negative electrode having a negative electrode current collector in which the aluminum member for electrodes is used for a negative electrode and a layer including a negative electrode active material that is formed on the surface of the negative electrode current collector.

Here, regarding the negative electrode active material, it is possible to appropriately employ materials described in paragraph [0089] of JP2012-216513A, the content of which is incorporated into the present specification by reference.

[Other Applications]

The aluminum member for electrodes according to the embodiment of the present invention can be used not only as a current collector for a storage device but also as an electrolytic condenser.

EXAMPLES

Hereinafter, the present invention will be described in more detail on the basis of examples. Materials, amounts used, ratios, treatment contents, treatment orders, and the like described in the following examples can be appropriately modified within the scope of the gist of the present invention. Therefore, the scope of the present invention should not be interpreted in a limited manner by the examples described below.

Example 1

<Preparation of Aluminum Member for Electrodes>

A treatment which will be described below was carried out on the surface of an aluminum substrate having an average thickness of 20 μm and a size of 200 mm×300 mm (JIS H-4160, alloy number: 1N30-H, aluminum purity: 99.30%) to prepare an aluminum member for electrodes.

(a-1) Aluminum Hydroxide Coating Forming Treatment (Coating Forming Step)

An electrolytic treatment was carried out under a condition of the sum of the quantities of electricity of 800 C/dm$^2$ using an electrolytic solution (nitric acid concentration: 0.8%, sulfuric acid concentration: 0.7%, aluminum concentration: 0.5%) which was held at 50° C. and the above-described aluminum substrate as a cathode, thereby forming an aluminum hydroxide coating on the aluminum substrate. Meanwhile, the electrolytic treatment was carried out using a direct current power supply. The current density was set to 50 A/dm$^2$.

After the formation of the aluminum hydroxide coating, the aluminum hydroxide coating was washed with water by spraying.

(b-1) Electrolytic Dissolution Treatment (Through Hole Forming Step)

Next, an electrolytic treatment was carried out under a condition of the sum of the quantities of electricity being 800 C/dm$^2$ using an electrolytic solution (nitric acid concentration: 0.8%, sulfuric acid concentration: 0.7%, aluminum concentration: 0.5%) which was held at 50° C. and the aluminum substrate as an anode, and through holes were formed in the aluminum substrate and the aluminum hydroxide coating. Meanwhile, the electrolytic treatment was carried out using a direct current power source. The current density was set to 30 A/dm$^2$.

After the formation of the through holes, the aluminum substrate and the aluminum hydroxide coating were washed with water by spraying.

(c-1) Aluminum Hydroxide Coating Removing Treatment (Coating Removing Step)

Next, the aluminum substrate that had been subjected to the electrolytic dissolution treatment was immersed in an aqueous solution (liquid temperature: 37° C.) having an sodium hydroxide concentration of 5% by mass and an aluminum ion concentration of 0.3% by mass for 40 seconds and the aluminum hydroxide coating was removed.

After the removal of the aluminum coating, the aluminum substrate was washed with water by spraying.

(d-1) Oxide Film Forming Treatment (Oxide Film Forming Step)

Next, the aluminum substrate after the coating removing treatment was immersed in an aqueous solution (liquid temperature: 50° C.) having a nitric acid concentration of 1% by mass and an aluminum ion concentration of 0.5% by mass for 20 seconds to form an oxide film on the surface of the aluminum substrate.

Thereafter, the aluminum substrate was washed with water by spraying.

(e-1) Drying Step

Next, moisture remaining on the surface of the aluminum substrate which had the oxide film formed thereon and had been subjected to water washing was removed with an air knife and further dried by heating at a drying temperature of 105° C. for 10 seconds to prepare an aluminum member for electrodes.

Example 2

An aluminum member for electrodes was prepared in the same manner as in Example 1 except that instead of the oxide film forming step shown in (d-1) above, an oxide film forming step shown in (d-2) below was carried out.

(d-2) Oxide Film Forming Treatment (Oxide Film Forming Step)

Next, the aluminum substrate after the coating removing treatment was immersed in an aqueous solution (liquid temperature: 50° C.) having a sulfuric acid concentration of 30% and an aluminum ion concentration of 0.5% by mass for 20 seconds to form an oxide film on the surface of the aluminum substrate.

Then, the aluminum substrate was washed with water by spraying.

Example 3

An aluminum member for electrodes was prepared in the same manner as in Example 1 except that instead of the drying step shown in (e-1) above, a drying step shown in (e-2) below was carried out and further, an oxide film densification step shown in (f-1) below was carried out.

(e-2) Drying Step

Next, moisture remaining on the surface of the aluminum substrate which had the oxide film formed thereon and had been subjected to water washing was removed with an air knife and further dried by heating at a drying temperature of 70° C. for 10 seconds.

(f-1) Oxide Film Densification Step (High Temperature Heating Treatment)

Thereafter, a high temperature heating treatment was carried out by putting the aluminum substrate in an oven at 300° C. for 3 minutes to prepare an aluminum member for electrodes.

Example 4

An aluminum member for electrodes was prepared in the same manner as in Example 3 except that instead of the oxide film forming step shown in (d-1) above, an oxide film forming step shown in (d-2) below was carried out.

Example 5

An aluminum member for electrodes was prepared in the same manner as in Example 3 except that instead of the oxide film densification step shown in (f-1) above, an oxide film densification step shown in (f-2) below was carried out.

(f-2) Oxide Film Densification Step (High Temperature Heating Treatment)

Thereafter, a high temperature heating treatment was carried out by putting the aluminum substrate in an oven at 300° C. for 8 minutes to prepare an aluminum member for electrodes.

Example 6

An aluminum member for electrodes was prepared in the same manner as in Example 3 except that instead of the oxide film densification step shown in (f-1) above, an oxide film densification step shown in (f-3) below was carried out.

(f-3) Oxide Film Densification Step (High Temperature Heating Treatment)

Thereafter, a high temperature heating treatment was carried out by putting the aluminum substrate in an oven at 230° C. for 3 minutes to prepare an aluminum member for electrodes.

Example 7

An aluminum member for electrodes was prepared in the same manner as in Example 1 except that after the drying step shown in (e-1) above, the oxide film densification step shown in (f-1) above was carried out and further an oxide film densification step shown in (f-1) below was further carried out.

Example 8

An aluminum member for electrodes was prepared in the same manner as in Example 7 except that instead of the oxide film forming step shown in (d-1) above, the oxide film forming step shown in (d-2) above was carried out.

Example 9

An aluminum member for electrodes was prepared in the same manner as in Example 1 except that the aluminum hydroxide coating forming treatment shown in (a-1) above and the electrolytic dissolution treatment shown in (b-1) below were not carried out.

In this example, since the aluminum hydroxide coating forming treatment shown in (a-1) above was not carried out, an aluminum hydroxide coating was not formed on the aluminum substrate fed for the aluminum hydroxide coating removing treatment shown in (c-1) above. However, by carrying out the aluminum hydroxide coating removing treatment shown in (c-1) above, the rolling oil or the like is removed.

Example 10

An aluminum member for electrodes was prepared in the same manner as in Example 9 except that instead of the oxide film forming step shown in (d-1) above, the oxide film forming step shown in (d-2) above was carried out.

Comparative Example 1

An aluminum member for electrodes was prepared in the same manner as in Example 1 except that instead of the oxide film forming treatment shown in (d-1) above, an oxide film forming treatment shown in (d-4) below was carried out.

(d-4) Oxide Film Forming Treatment (Oxide Film Forming Step)

Next, the aluminum substrate after the coating removing treatment was immersed in an aqueous solution (liquid temperature: 50° C.) having a hydrochloric acid concentration of 1% by mass and an aluminum ion concentration of 0.5% by mass for 20 seconds to form an oxide film on the surface of the aluminum substrate.

Thereafter, the aluminum substrate was washed with water by spraying.

Comparative Example 2

An aluminum member for electrodes was prepared in the same manner as in Example 1 except that instead of the oxide film forming treatment shown in (d-1) above, the oxide film forming treatment shown in (d-2) above was carried out and instead of the drying step shown in (e-1) above, the drying step shown in (e-2) above was carried out.

Comparative Example 3

An aluminum member for electrodes was prepared in the same manner as in Example 1 except that instead of the drying step shown in (e-1) above, the drying step shown in (e-2) above was carried out.

Comparative Example 4

An aluminum member for electrodes was prepared in the same manner as in Comparative Example 3 except that after the drying step shown in (e-2) above, an oxide film densification step shown in (f-4) below was further carried out.

(f-4) Oxide Film Densification Step (High Temperature Heating Treatment)

Thereafter, a high temperature heating treatment was carried out by putting the aluminum substrate in an oven at 300° C. for 60 minutes to prepare an aluminum member for electrodes.

Comparative Example 5

An aluminum member for electrodes was prepared in the same manner as in Comparative Example 3 except that after the drying step shown in (e-2) above, an oxide film densification step shown in (f-5) below was further carried out.

(f-5) Oxide Film Densification Step (High Temperature Heating Treatment)

Thereafter, a high temperature heating treatment was carried out by putting the aluminum substrate in an oven at 70° C. for 3 minutes to prepare an aluminum member for electrodes.

[Measurement of Average Opening Diameter and Average Opening Ratio of Through Holes and Film Thickness and Density of Oxide Film]

The average opening diameter and the average opening ratio of the through holes formed in the prepared aluminum members for electrodes, and the density and the film thickness of the oxide film were respectively measured by the following methods.

<Measurement of Average Opening Diameter of Through Holes>

The average opening diameter of the through holes was obtained by capturing an image of the surface of the aluminum member for electrodes from right above using a high resolution scanning electron microscope (SEM) at a magnification of 200 times, extracting at least 20 through holes having a circumference that continues in a ring shape from the obtained SEM image, scanning the opening diameters thereof, and calculating the average value thereof as the average opening diameter.

<Measurement of Average Opening Ratio of Through Holes>

The average opening ratio of the through holes was obtained by capturing an image of the surface of the aluminum member for electrodes from right above using a high resolution scanning electron microscope (SEM) at a magnification of 200 times, binarizing (five) 30 mm×30 mm visual fields in the obtained SEM image using image analysis software or the like so as to observe through hole portions and non-through hole portions, calculating the ratio (the opening area/the geometric area) from the total opening area of the through holes and the area of the visual fields (the geometric area), and calculating the average value of those at the respective visual fields (five places) as the average opening ratio.

<Measurement of Film Thickness of Oxide Film>

The film thickness was measured by observing the cross section with a transmission electron microscope (TEM).

<Measurement of Density of Oxide Film>

The areal density of the oxide film was measured using a high resolution Rutherford backscattering spectrometry (RBS) HRBS500 (HR-RBS) manufactured by Kobe Steel, Ltd. He ions with an energy of 450 keV were made incident on a sample at 62.5 degrees to the normal to the sample surface (the surface of the oxide film of the aluminum member for electrodes), and the scattered He ions were detected by a deflection magnetic field type energy analyzer at a position of a scattering angle of 55 degrees to obtain areal density. The obtained areal density (atoms/cm$^2$) was converted into mass areal density (g/cm$^2$) and the density (g/cm$^3$) of the oxide film was calculated from this value and the film thickness measured with a transmission electron microscope (TEM).

The measurement results of the average opening diameter and the average opening ratio of the through holes of each of the aluminum members for electrodes, and the film thickness and the density of the oxide film are shown in Table 1.

Figure 4:
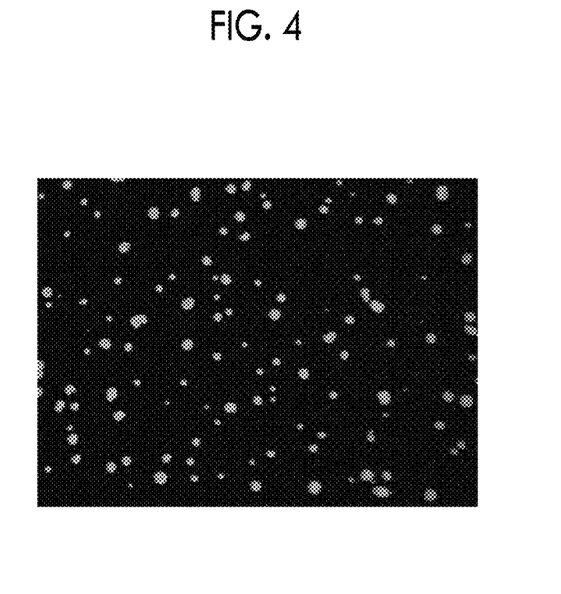
FIG. 4 is an optical micrograph of an aluminum member for electrodes prepared in Example 1.
Figure 5:
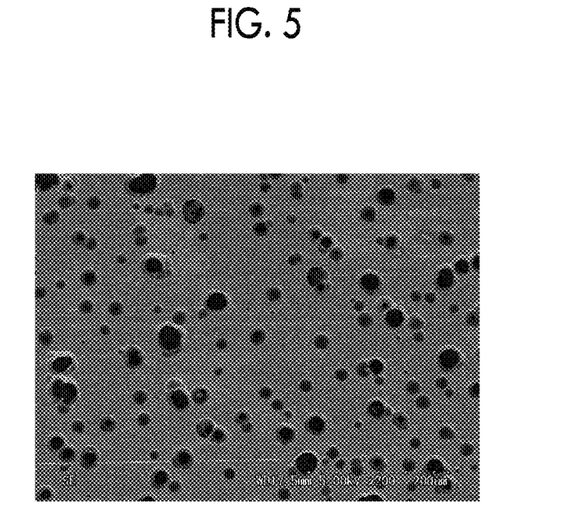
FIG. 5 is an SEM image of an aluminum member for electrodes prepared in Example 1.

In addition, images of the surface of the aluminum member for electrodes prepared in Example 1 were captured using an optical microscope (M205C manufactured by LEICA Microsystems, magnification: 100 times) and SEM (S-3000N manufactured by HITACHI High-Technologies Corporation, magnification: 200 times). The captured images are respectively shown in FIGS. 4 and 5.

[Evaluation]

The film thickness of the oxide film with time and the resistance of the electrodes using the prepared aluminum members for electrodes were evaluated.

<Film Thickness of Oxide Film with Time>

After leaving the oxide film in an atmosphere at a temperature of 25° C. and a relative humidity of 70% for 3 weeks, the film thickness of the oxide film was measured.

<Electric Resistance>

(Preparation of Electrode)

An electrically conductive paste (VARNIPHITE T-602 manufactured by Nippon Graphite Industries, Co., Ltd.) was applied to one surface of the aluminum member for electrodes at a coating thickness of 3 μm and then dried under reduced pressure under the conditions at 200° C. for 24 hours to form a conductive layer, thereby preparing an electrode.

(Measurement of Electric Resistance)

Copper probes having φ 2.8 cm was closely attached to the front and rear surfaces of the aluminum member for electrodes on which the conductive layer was formed (electrode) by applying a load of 0.20 MPa, and the electric resistance value was measured using a resistance meter (RESISTANCE HiTESTER 3541 manufactured by Hioki E.E. Corporation).

The evaluation results are shown in Table 1.

TABLE 1

| | Through hole | | | Oxide film densification step | | | Oxide film | | Evaluation | |
|---|---|---|---|---|---|---|---|---|---|---|
| | Average opening diameter μm | Average opening ratio % | Oxide film forming treatment Acid | Drying step Temperature ° C. | Heating time minutes | Heating temperature ° C. | Density g/cm$^3$ | Film thickness nm | Film thickness with time nm | Resistance with time mΩ |
| Example 1 | 19 | 4 | Nitric acid | 105 | None | None | 2.9 | 3.2 | 3.9 | 28 |
| Example 2 | 19 | 4 | Sulfuric acid | 105 | None | None | 2.8 | 3.6 | 4.1 | 29 |
| Example 3 | 19 | 4 | Nitric acid | 70 | 3 | 300 | 3.0 | 3.3 | 3.7 | 27 |
| Example 4 | 19 | 4 | Sulfuric acid | 70 | 3 | 300 | 2.8 | 3.7 | 4.1 | 29 |
| Example 5 | 19 | 4 | Nitric acid | 70 | 8 | 300 | 3.1 | 3.3 | 3.7 | 26 |
| Example 6 | 19 | 4 | Nitric acid | 70 | 3 | 230 | 2.7 | 3.2 | 4.0 | 28 |
| Example 7 | 19 | 4 | Nitric acid | 105 | 3 | 300 | 3.1 | 3.3 | 3.7 | 26 |
| Example 8 | 19 | 4 | Sulfuric acid | 105 | 3 | 300 | 3.0 | 3.4 | 3.8 | 26 |
| Example 9 | — | — | Nitric acid | 105 | None | None | 3.0 | 3.2 | 3.8 | 28 |
| Example 10 | — | — | Sulfuric acid | 105 | None | None | 2.9 | 3.2 | 3.9 | 28 |
| Comparative Example 1 | 19 | 4 | Hydrochloric acid | 105 | None | None | 2.4 | 2.8 | 5.5 | 43 |
| Comparative Example 2 | 19 | 4 | Sulfuric acid | 70 | None | None | 2.6 | 3.1 | 5.2 | 38 |
| Comparative Example 3 | 19 | 4 | Nitric acid | 70 | None | None | 2.6 | 3.0 | 5.1 | 36 |

TABLE 1-continued

| | Through hole | | | Oxide film densification step | | | Oxide film | | Evaluation | |
|---|---|---|---|---|---|---|---|---|---|---|
| | Average opening diameter μm | Average opening ratio % | Oxide film forming treatment Acid | Drying step Temperature °C. | Heating time minutes | Heating temperature °C. | Density g/cm³ | Film thickness nm | Film thickness with time nm | Resistance with time mΩ |
| Comparative Example 4 | 19 | 4 | Nitric acid | 70 | 60 | 300 | 3.6 | 6.2 | 6.3 | 45 |
| Comparative Example 5 | 19 | 4 | Nitric acid | 70 | 3 | 70 | 2.5 | 3.4 | 5.3 | 41 |

As shown in Table 1, from the comparison of Examples and Comparative Examples, it is found that since the oxidation proceeding with time can be suppressed in the aluminum members for electrodes in which the oxide film has a density of 2.7 to 4.1 g/cm³ and a film thickness of 5 nm or less, an increase in the film thickness of the oxide film can be suppressed and a low electric resistance state can be stably maintained.

Further, from the comparison of Examples 1 to 4, it is found that as the density of the oxide film becomes higher, an increase in the film thickness with time becomes smaller.

From the above, the effect of the present invention is obvious.

EXPLANATION OF REFERENCES

1: aluminum substrate
2: aluminum hydroxide coating
3: aluminum substrate having through holes
4: aluminum hydroxide coating having through holes
5: through hole
10, 20: aluminum member for electrodes
12: oxide film
14: oxide film having through holes

What is claimed is:

1. A method of producing an aluminum member for electrodes, the method comprising:
    a coating forming step of carrying out an electrolytic treatment in a first acidic aqueous solution using an aluminum substrate as a cathode to form an aluminum hydroxide coating on a surface of the aluminum substrate;
    a coating removing step of bringing the aluminum substrate after the coating forming step into contact with an alkaline aqueous solution to remove the aluminum hydroxide coating;
    an oxide film forming step of bringing the aluminum substrate after the coating removing step into contact with a second acidic aqueous solution to form an oxide film on the surface of the aluminum substrate, wherein the oxide film has a density of 2.7 to 4.1 g/cm³ and a thickness of 5 nm or less;
    a water washing step of washing the aluminum substrate with water after the oxide film forming step; and
    a drying step of removing a water film adhering to the oxide film of the aluminum substrate after the water washing step.

2. The method of producing an aluminum member for electrodes according to claim 1, further comprising:
    a through hole forming step of carrying out an electrolytic treatment in a third acidic aqueous solution using the aluminum substrate as an anode to form through holes in the aluminum substrate and the aluminum hydroxide coating after the coating forming step and before the coating removing step.

3. The method of producing an aluminum member for electrodes according to claim 1,
    wherein the second acidic aqueous solution includes nitric acid, sulfuric acid, phosphoric acid, oxalic acid, or a mixed acid of two or more thereof.

4. The method of producing an aluminum member for electrodes according to claim 1,
    wherein the second acidic aqueous solution includes nitric acid, sulfuric acid, or a mixed acid thereof.

5. The method of producing an aluminum member for electrodes according to claim 1
    wherein the drying step is a step of heating the aluminum substrate to 100° C. to 200° C.

6. The method of producing an aluminum member for electrodes according to claim 1, further comprising:
    an oxide film densification step of heating the aluminum substrate after the water washing step and removing a hydrate contained in the oxide film of the aluminum substrate to densify the oxide film.

7. The method of producing an aluminum member for electrodes according to claim 6,
    wherein a heating temperature in the oxide film densification step is 100° C. to 400° C.

8. A method of producing an aluminum member for electrodes, the method comprising:
    a coating forming step of carrying out an electrolytic treatment in a first acidic aqueous solution using an aluminum substrate as a cathode to form an aluminum hydroxide coating on a surface of the aluminum substrate;
    a coating removing step of bringing the aluminum substrate after the coating forming step into contact with an alkaline aqueous solution to remove the aluminum hydroxide coating;
    an oxide film forming step of bringing the aluminum substrate after the coating removing step into contact with a second acidic aqueous solution to form an oxide film on the surface of the aluminum substrate, wherein the oxide film has a density of 2.7 to 4.1 g/cm³ and a thickness of 5 nm or less;
    a water washing step of washing the aluminum substrate with water after the oxide film forming step; and
    a through hole forming step of carrying out an electrolytic treatment in a third acidic aqueous solution using the aluminum substrate as an anode to form through holes in the aluminum substrate and the aluminum hydroxide coating after the coating forming step and before the coating removing step.

9. A method of producing an aluminum member for electrodes, the method comprising:

a coating forming step of carrying out an electrolytic treatment in a first acidic aqueous solution using an aluminum substrate as a cathode to form an aluminum hydroxide coating on a surface of the aluminum substrate;

a coating removing step of bringing the aluminum substrate after the coating forming step into contact with an alkaline aqueous solution to remove the aluminum hydroxide coating;

an oxide film forming step of bringing the aluminum substrate after the coating removing step into contact with a second acidic aqueous solution to form an oxide film on the surface of the aluminum substrate, wherein the oxide film has a density of 2.7 to 4.1 $g/cm^3$ and a thickness of 5 nm or less;

a water washing step of washing the aluminum substrate with water after the oxide film forming step; and an oxide film densification step of heating the aluminum substrate after the water washing step and removing a hydrate contained in the oxide film of the aluminum substrate to densify the oxide film.

\* \* \* \* \*